United States Patent
Liddell et al.

(10) Patent No.: US 9,540,706 B2
(45) Date of Patent: Jan. 10, 2017

(54) HYDROMETALLURGICAL TREATMENT PROCESS FOR EXTRACTION OF METALS FROM CONCENTRATES

(71) Applicant: LIFEZONE LIMITED, Ebene (MU)

(72) Inventors: Keith Stuart Liddell, Surrey (GB); Michael David Adams, Phuket (TH)

(73) Assignee: LIFEZONE LIMITED, Ebene (MU)

( * ) Notice: Subject to any disclaimer, the term of this patent is extended or adjusted under 35 U.S.C. 154(b) by 172 days.

(21) Appl. No.: 14/409,831

(22) PCT Filed: Jul. 12, 2013

(86) PCT No.: PCT/IB2013/055760
§ 371 (c)(1),
(2) Date: Dec. 19, 2014

(87) PCT Pub. No.: WO2014/009928
PCT Pub. Date: Jan. 16, 2014

(65) Prior Publication Data
US 2015/0344990 A1    Dec. 3, 2015

(30) Foreign Application Priority Data

Jul. 13, 2012 (ZA) .................. 2012/05222

(51) Int. Cl.
*C22B 3/08* (2006.01)
*C22B 3/10* (2006.01)
(Continued)

(52) U.S. Cl.
CPC .............. *C22B 1/02* (2013.01); *C21B 15/006* (2013.01); *C22B 3/08* (2013.01); *C22B 3/10* (2013.01);
(Continued)

(58) Field of Classification Search
CPC ................ C22B 3/08; C22B 3/10; C22B 3/22; C22B 11/04; C22B 11/06
See application file for complete search history.

(56) References Cited

U.S. PATENT DOCUMENTS 3,586,498 A * 6/1971 Kasey ...................... C22B 3/44
423/146
6,579,504 B1 * 6/2003 Liddell ................... C22B 11/06
423/22

FOREIGN PATENT DOCUMENTS

| CA | 2332520 C | 6/2009 |
| WO | 9960178 A1 | 11/1999 |
| ZA | 20006600 | 7/2001 |

OTHER PUBLICATIONS

Mike Adams et al., "Hydrometallurgical processing of Platreef flotation concentrate" Minerals Engineering 545-550 (2011).
(Continued)

*Primary Examiner* — George Wyszomierski
*Assistant Examiner* — Tima M McGuthry Banks
(74) *Attorney, Agent, or Firm* — Browdy and Neimark, PLLC (57) ABSTRACT

This invention relates to a hydrometallurgical process for extracting platinum group metals (PGMs), gold, silver and base metals from a flotation concentrate (10) containing sulphide minerals such as pentlandite and chalcopyrite, along with pyrite and pyrrohotite. The process includes a modified pressure oxidation step (12) to selectively separate base metals into sulphate medium (14), from the PGMs. The modified pressure oxidation step (12) partially or completely oxidizes sulphide minerals to produce a product slurry (14) containing base metal sulphates in solution and a solid residue containing PGMs along with sulphate and elemental sulphur. The solid residue is subjected to a thermal treatment (18) to remove sulphate and elemental sulphur from the solid residue, and to condition the PGMs to be soluble in chloride medium. The treated solid residue is the subjected to PGM recovery by leaching in chloride leaching medium (20) to recover the PGMs.

24 Claims, 5 Drawing Sheets

(51) Int. Cl.
    *C22B 3/22*     (2006.01)
    *C22B 11/00*     (2006.01)
    *C22B 1/02*     (2006.01)
    *C21B 15/00*     (2006.01)
    *C22B 3/00*     (2006.01)
    *C22B 11/06*     (2006.01)

(52) U.S. Cl.
    CPC ................ *C22B 3/22* (2013.01); *C22B 11/04* (2013.01); *C22B 11/06* (2013.01); *Y02P 10/234* (2015.11)

(56) References Cited

OTHER PUBLICATIONS

Jong Shik Chung et al.,"Removal of H2s and/ or SO2 BY Catalytic conversion technologies" Catalysis Today, pp. 37-43, (1997).

Liddell, K., et al., "Energy consumptions for Kell hydrometallurgical refining versus conventional pyrometallurgical smelting and refining of PGM concentrates." The 4th International Platinum Conference, Platinum in transition 'Boom or Bust', The Southern African Institute of Mining and Metallurgy, (2010).

Liddell,K., et al.,"Energy consumption for Kell hydrometallurgical refining versus conventional pyrometallurgical smelting and refining of PGM concentrates" The Journal of the Southern African Institute of Mining and Metallurgy, vol. 111, (Feb. 2011).

Liddell, K., et al., "Kell hydrometallurgical process for extraction of platinum group metals and base metals from flotation concentrates", The Journal of the Southern African Institute of Mining and Metallurgy, vol. 112, (Jan. 2012).

Liu, W., et al., "Reduction of sulfur dioxide by carbon monoxide to elemental sulfur over composite oxide catalysts", Applied Catalyst, Department of Chemical Engineering, Massachusetts Institute of Technology, Cambridge, MA 02139, USA., (Mar. 25, 1994).

Pack, et al., "Gas pipeline preferential site selection occurrence for elemental sulphur & other particle matter formation & deposition", Journal of Petroleum Science and Engineering, pp. 12-18, (Jun. 5, 2012).

* cited by examiner

HYDROMETALLURGICAL TREATMENT PROCESS FOR EXTRACTION OF METALS FROM CONCENTRATES

BACKGROUND OF THE INVENTION

As resource companies evaluate increasingly more difficult polymetallic orebodies to assess their potential for exploitation, so does the metallurgical challenge increase. This is particularly the case for ores containing significant amounts of platinum group metals (PGMs), gold and silver together with valuable base metals such as nickel, cobalt and copper. Sulphide concentrates can present challenges to conventional processing by smelting, for example when barren sulphides such as pyrite and pyrrohotite contaminate the concentrate with significant amounts of iron and sulphur that have to be dealt with in an efficient and environmentally responsible manner.

In many cases there are potential technical, economic and environmental benefits from application of a robust hydrometallurgical processing route to these projects. These may include lower power costs, higher overall metal recoveries and lower $SO_2$ and $CO_2$ emissions to the atmosphere.

Figure 1:
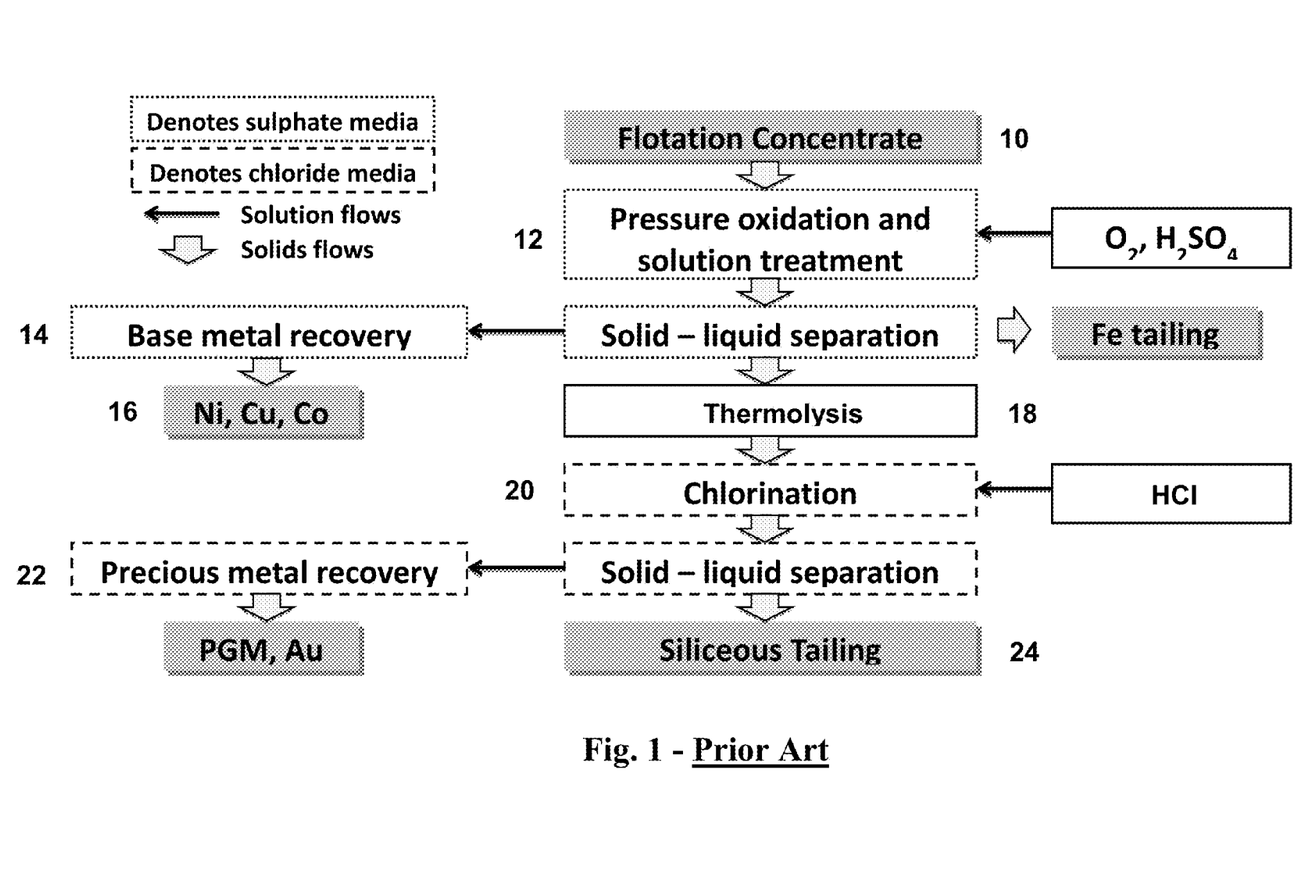
FIG. 1 is a simplified block flowsheet diagram of Kell process.

The novel process route described herein exemplifies significant developments that augment the process route described in international patent publication no. WO 99/60178 (the content of which is incorporated herein by reference), and which is known as the "Kell Process" (FIG. 1). This invention describes a novel way of treating the iron and sulphur, thereby removing concentrate quality constraints so that the flotation recovery of the valuable metal can be maximized. The Kell process route comprises the steps of:

leaching flotation concentrate (10) in a pressure oxidation sulphide leach (12) to dissolve base metal sulphides in the flotation concentrate and forming a sulphide leach filtrate (14) containing base metals (16) and a residue containing PGMs; and separating the sulphide leach filtrate (14) from the residue; and roasting (18) the residue to form a calcine; and leaching (20) the calcine in a chloride leach to dissolve the PGMs into solution forming a chloride leach filtrate for PGM recovery (22) and a solid waste residue (24).

The Kell process route has been successfully tested on several different sulphide concentrates, including those from the UG-2 chromitite horizon, Merensky reef, Platreef and North American polymetallic concentrates, achieving high 90s percent recoveries of separate Ni/Co/Cu and PGM solution streams.

The quantity and type of sulphide minerals in the flotation concentrate are present to varying extents, depending on factors such as ore mineralogy, flotation mass pull, relative flotabilities of the minerals, requirement to maximise overall metal recovery and other considerations. Barren sulphide minerals that do not bear valuable precious and base metals may be recovered into the flotation concentrate to a greater or lesser extent, depending on these factors. Hence, sulphur and iron levels in the feed concentrate may vary considerably. These barren sulphides, such as pyrite and pyrrohotite are difficult to depress in the flotation process without detrimentally reducing the recovery of the valuable metals to the concentrate. The iron and sulphur that the barren sulphides bring with them have to be disposed of in a cost-effective and environmentally acceptable manner.

It is an object of this invention to address this difficulty.

SUMMARY OF THE INVENTION

This invention relates to a hydrometallurgical process for extracting platinum group metals (PGMs) i.e. platinum, palladium, rhodium, iridium, ruthenium, osmium, and gold, silver and base metals, especially Ni, Co and Cu, from a flotation concentrate, for example a concentrate containing sulphide minerals such as pentlandite and chalcopyrite, along with pyrite and pyrrohotite. The process includes the steps:

1) subjecting the concentrate to a modified pressure oxidation step to selectively separate base metals into sulphate medium, from the PGMs, wherein the modified pressure oxidation step partially or completely oxidizes sulphide minerals to produce a product slurry containing base metal sulphates in solution and a solid residue containing PGMs along with sulphate and elemental sulphur;

2) the product slurry from the modified pressure oxidation step 1) is filtered to provide a solid residue containing PGMs along with sulphate and elemental sulphur, and a filtrate containing base metal sulphates;

3) the solid residue from step 2) is subjected to a thermal treatment:
   a. to remove sulphate and elemental sulphur from the solid residue as disulphide, sulphur dioxide and/or hydrogen sulphide gas, and
   b. to condition the PGMs to be soluble in chloride medium; and 4) the treated solid residue from step 3) is subjected to PGM recovery by leaching in chloride leaching medium to recover the PGMs.

At step 3), the solid residue is typically subjected to a thermal treatment:
   a. at 300-750° C. for up to 120 minutes, typically 400-650° C. for 10 to 30 minutes, under oxidizing, neutral or reducing conditions, to remove sulphate and elemental sulphur from the solid residue as disulphide, sulphur dioxide and/or hydrogen sulphide gas,
   b. at 500-1000° C. for up to 120 minutes, typically 700-1000° C. for 30 to 120 minutes, under oxidizing, neutral or reducing conditions, to condition the PGMs to be soluble in chloride medium.

The product slurry from the modified pressure oxidation step 1) is optionally subjected to a hot acidic conditioning step or atmospheric leach, to effect the removal of further iron as well as potentially aluminium and magnesium sulphates, to the solution phase, and then subjected to step 2).

Management of Sulphur

At step 1), the acid and oxygen addition rates, temperature, pressure, slurry density and residence times, are controlled to obtain oxidation of the sulphide minerals may be achieved so that more than 10%, more than 20%, more than 30%, more than 40%, more than 50% and up to 80% by mass of the sulphur is retained as elemental sulphur or sulphates, in the pressure oxidation solid residue.

Where sulphide levels in the flotation concentrate are relatively high, i.e. approximately 5-30% by mass sulphur, pressure oxidation conditions in the sulphide leach are selected in this process so as to control a partial oxidation of the sulphide minerals so that a majority (more than 50%, up to approximately 80% by mass) of the sulphur is retained, as elemental sulphur or as sulphates, in the pressure oxidation solid residue. The remainder of the sulphur is converted to sulphuric acid, which may assist with the leaching process. For example, the pressure oxidation leach may be carried out at 100-230° C. and 500-3000 kPa.

Sulphur dispersing agent/s may be added to the sulphide leach to control sulphur agglomeration, including commonly used deflocculant reagents such as lignosulphonates, quebracho and others.

At step 3a), sulphur may be recovered from dryer off-gases:
a. by condensation as an elemental sulphur intermediate product;
b. into a sulphuric acid intermediate product; or
c. into a sulphide, polysulphide, polythionate, thiosulphate or similar intermediate product.

Management of Iron

A second aspect of the invention relates to the removal of iron from the process.

At step 2) excess soluble iron may be removed from the sulphate circuit residue produced by filtration of the slurry discharge from the modified pressure oxidation by conventional atmospheric or low-pressure atmospheric leach using sulphuric acid, allowing recovery of sulphuric acid and precipitation of a potentially saleable or storable iron product. For example, the iron sulphate is treated by pressure autoclave technology, as described in international patent publication no. WO 99/60178 (the content of which is incorporated herein by reference). In addition, other technologies such as precipitation or crystallization may be employed to produce a potentially saleable or storable ferric or ferrous hydroxide or sulphate product while recovering sulphuric acid into a stream suitable for recycling. Alternatively, conventional atmospheric or low-pressure atmospheric leach using sulphuric acid may be applied directly to the POX product slurry from step 1), allowing removal of excess iron sulphates from the solid residue into the sulphate circuit filtrate solution for removal by air- or oxygen-sparged ferric hydroxide precipitation under atmospheric or pressurized conditions.

At step 3), alternatively, or in addition to the iron removal process mentioned above, excess soluble iron in the thermally treated calcine may be removed by:
a. conventional atmospheric or low-pressure atmospheric leach using hydrochloric acid, allowing recovery of acid and precipitation of a potentially saleable or storable iron product;
b. solvent extraction, allowing recovery of acid and precipitation of a potentially saleable or storable iron product from chloride leach filtrate after conventional atmospheric or low-pressure leaching of the PGM using chlorinated hydrochloric acid; or
c. treated directly from chloride leach filtrate after conventional atmospheric or low-pressure leaching of the PGM using chlorinated hydrochloric acid; or
d. a combination of these approaches.

Iron chloride from the process mentioned above may be:
a. treated by pressure autoclave or other technology such as precipitation or crystallization, to produce a potentially saleable or storable iron-bearing product and recovering hydrochloric acid into a stream suitable for recycling;
b. concentrated by evaporation, reverse osmosis, nanofiltration or other membrane technology, to produce a potentially saleable ferric chloride product; or
c. treated by sparging/rectification, pyrohydrolysis or other technology such as sulphuric acid distillation, to produce an iron-bearing product.

In the process of the present invention, water consumption is preferably minimized by use of filtration and membrane techniques, allowing recycle of water to the process from either sulphate or chloride leach solution streams to their respective leach stages.

By utilization of the process of the present invention flotation process conditions may be modified to produce concentrates of lower-grade or higher-impurity specifications than required by smelters, obviating current constraints of concentrate impurity levels, and allowing for higher mass pulls and higher overall metals recoveries in the flotation step.

DESCRIPTION OF PREFERRED EMBODIMENTS

This invention describes a novel way of treating the iron and sulphur, thereby removing concentrate quality constraints so that the flotation recovery of the valuable metal can be maximised.

Figure 2A:
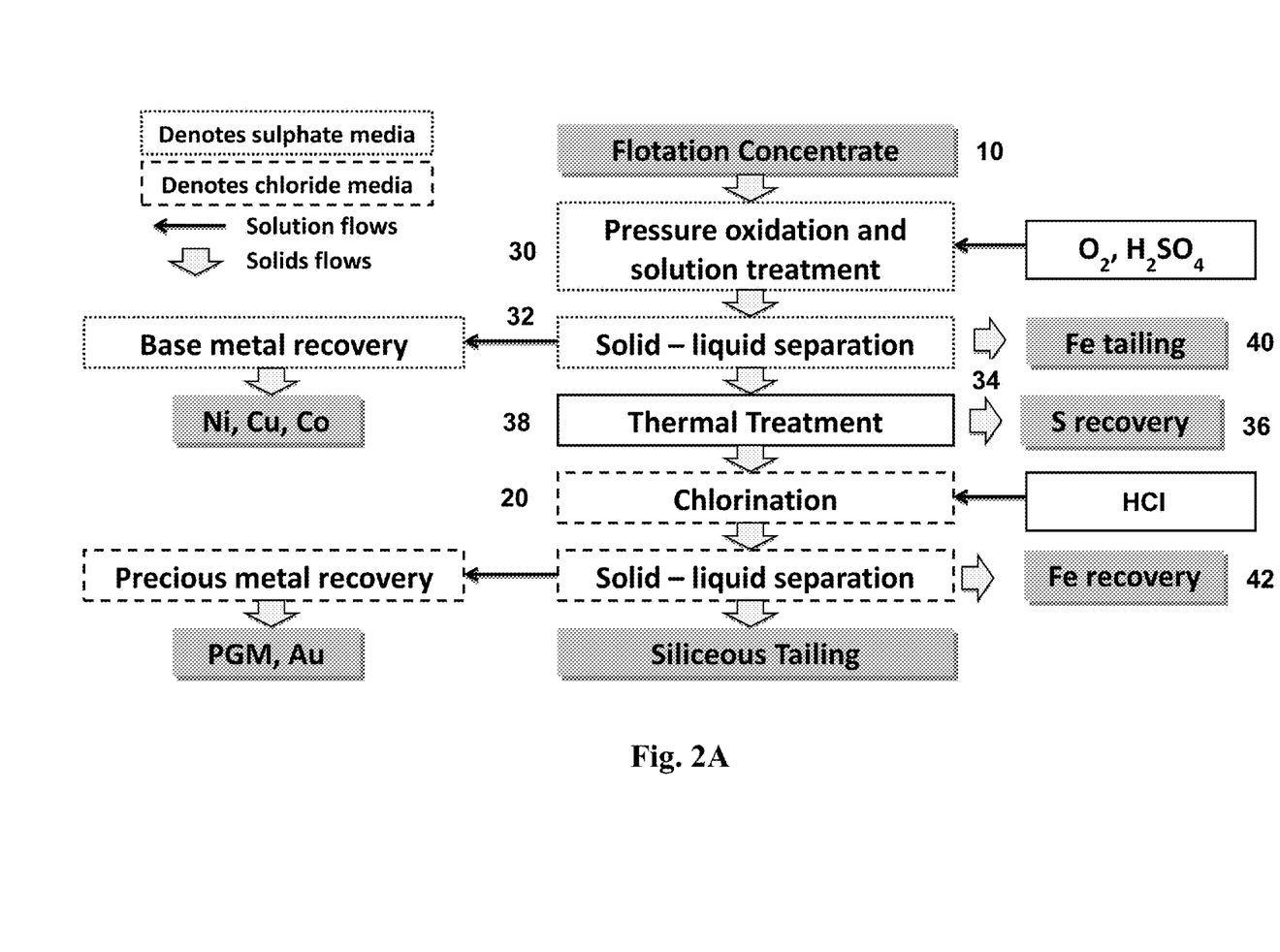
FIGS. 2A and 2B are simplified block flowsheet diagrams of a process of the present invention showing sulphur and iron recovery variations.
Figure 2B:
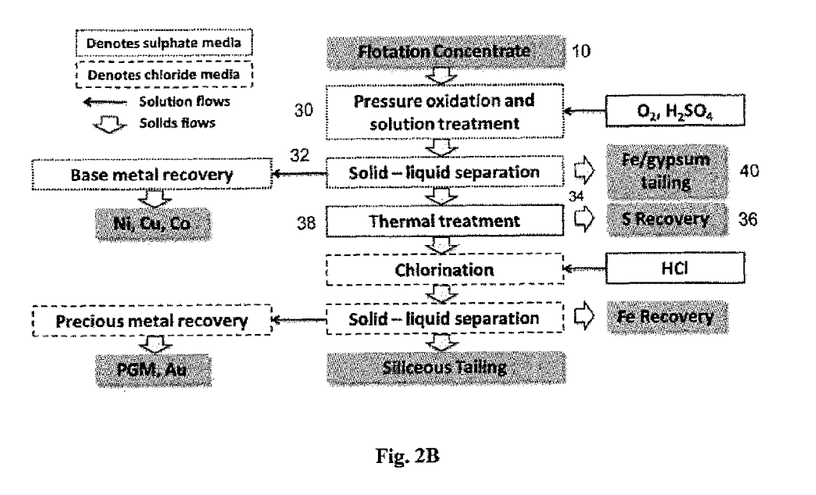
Figure 3:
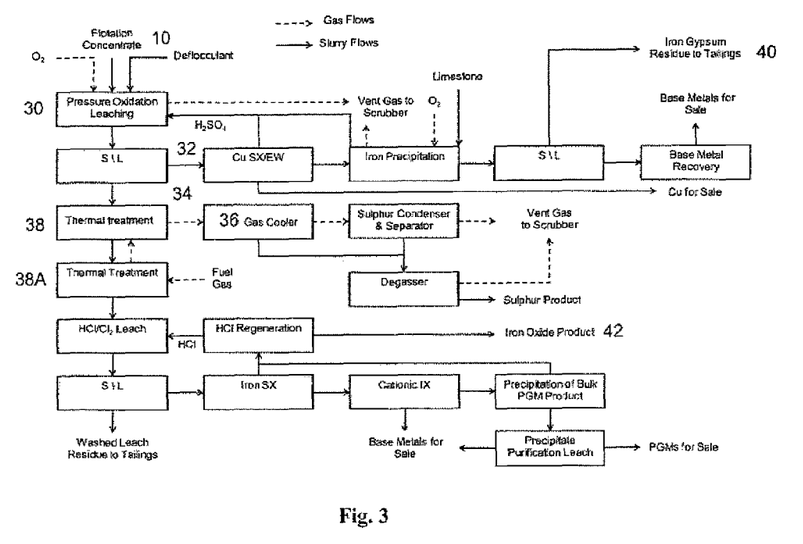
FIG. 3 is a block flowsheet diagram of the process of the present invention showing sulphur and iron recovery.
Figure 4:
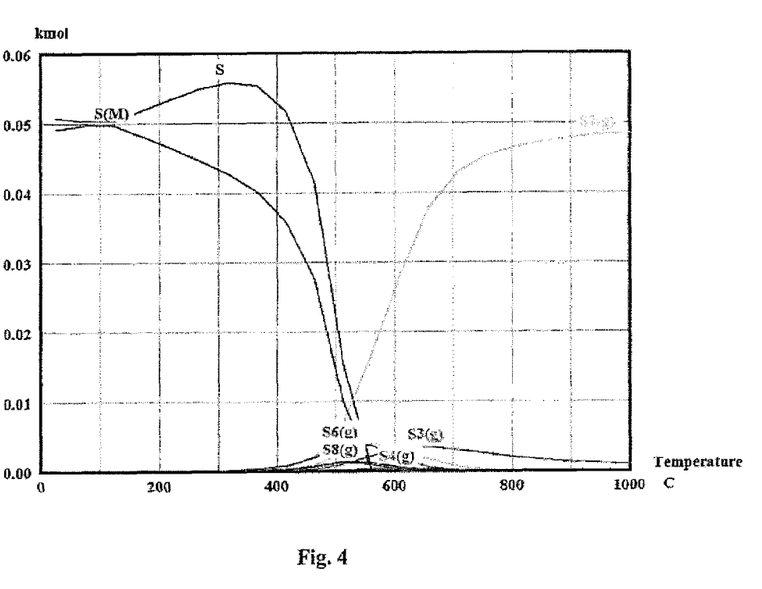
FIG. 4 is a thermochemical diagram depicting sulphur evaporation and condensation.

This invention, illustrated in FIGS. 2A, 2B and 3, relates a novel hydrometallurgical treatment process for extracting metals from a flotation concentrate (10) in which platinum group metals (PGMs), gold and silver are separated from other valuable metals such as nickel, cobalt and copper, whilst iron and sulphur components are extracted as potentially saleable products. This reduces the need for storage of residues containing sulphur, reduces the costs of treatment, including reagent and power costs, and allows the recycle of water, acids and other components. In the process of recycling acids, additional amounts of metals may be recovered. Base metals such as nickel, copper and cobalt may be recovered as sulphates in wash waters from final residues and are recycled along with sulphuric acid to sulphate streams earlier in the process. Any minor fugitive PGMs are likewise recovered as chlorides in wash waters from final residues and are recycled along with hydrochloric acid to chloride streams earlier in the process.

This invention makes use of a pressure oxidation (POX) leach treatment (30) to dissolve base metal sulphides. In a pressure oxidation leach, concentrate is subjected to pressure oxidation in an autoclave in the presence of an acidic solution with oxygen sparging into slurry or injection into gas headspace. A pre-conditioning step may be utilized to remove carbonate minerals by reuse of acid-containing streams, along with fresh acid addition if required. A high-pressure pump is used to transport the conditioned slurry typically to a multi-compartment autoclave for the oxidation to occur. The discharge slurry is let down to atmospheric pressure after existing the autoclave.

In the treatment of certain concentrates where sulphide levels are relatively high, 5-30% by mass, pressure oxidation conditions may be selected in this process (e.g. 100-160° C.;

500-2000 kPa) so as to control a partial oxidation of the sulphide minerals. This results in high recoveries of nickel, cobalt and copper to sulphate solution (32), and PGMs report to the pressure oxidation residue (34) for further processing for their recovery. In this way less heat and sulphuric acid are produced from processing high sulphide concentrates, which lowers the associated cooling, neutralization and waste storage requirements. Under these conditions most of the sulphide is partially oxidized to elemental sulphur and a small amount is fully oxidized to sulphate. Elemental sulphur occurs as cyclo-octasulphur ($S_8$), which melts at 115.21° C., boils at 444.6° C. and sublimes easily. Hence, in the lower part of the pressure oxidation temperature range, sulphur melting is minimal. In the region between 115° C. and 160° C., sulphur melting occurs. A range of sulphur dispersing agents may be used to readily control sulphur agglomeration, including commonly used deflocculant reagents such as lignosulphonates, quebracho and others.

In this embodiment a majority (from 50% up to approximately 80% by mass) of the sulphur is retained in the solids residue phase from pressure oxidation and is removed as disulphide gas (36) in an inert desulphurization step (38) (400-650° C.), followed by thermal treatment (38A) at 700-1000° C. to condition the PGM minerals to be soluble in chloride medium (see FIGS. 2A, 2B, 3 and 4). This can be achieved in either 1 or 2 kilns (depending on kiln designers' costings, amount of S and $SO_4$ in the kiln feed etc). Thus, sulphur removal can either be in one kiln with its own gas removal followed by the PGM thermal treatment kiln (for higher S POX residues), or one kiln where both operations take place and the POX residue heats up from ambient to 1000° C., with the first part of the kiln is sulphur removal and the second part the PGM conditioning. The hot gases from the PGM thermal treatment step flow counter-currently to the solids and are used as heat source in the desulphurization step. This gaseous $S_2$ may be readily condensed by decreasing the gas stream temperature below the ~450° C. boiling point using conventional condenser or chiller technologies, to be potentially available as a saleable by-product. This step has found application in the capture circuit typical of Claus plants for recovery of sulphur from crude oil desulphurizing. In a sulphur condenser, the process gas from the dryer is cooled to between 150 and 130° C. The condensation heat may be used to generate steam at the shell of the condenser for energy recovery. Liquid sulphur discharges from the process gas cooler, sulphur condensers and final sulphur separator are fed to a degassing unit, where the gases (such as $H_2S$) dissolved in the sulphur are removed.

Removal of the sulphur contained in the concentrate in this manner eliminates the need for sulphuric acid or sulphur dioxide plants or high-capacity gas scrubbing systems. Moreover, this obviates the need for storage of excess gypsum in tailings over and above the relatively small amount produced using standard precipitation techniques from low-sulphur concentrates.

In an embodiment POX conditions are controlled whereby sulphur is retained within the solids as sulphate compounds and is removed from the process by decomposition and the resultant sulphur dioxide gas is recovered by scrubbing in a wet acid plant to effect the recovery of sulphuric acid suitable for use in the process or for sale.

In these concentrate types iron is controlled by various means, depending on the inherent levels in the concentrate, chemistry and mineralogy. In some cases soluble iron is removed by conventional precipitation and deports along with insoluble iron to a stable solid residue (40).

In other cases excess amounts of soluble iron may be removed in the sulphate circuit by conventional atmospheric or low-pressure atmospheric leach using sulphuric acid. After potential removal of some free acidity by split recycle, precipitation, reverse osmosis, nanofiltration or other conventional means, iron is recovered by use of established pressure precipitation techniques at ~160-196° C., or concentration and crystallization. These processes yield a potentially saleable hematite, maghemite, magnetite or goethite product or a jarosite, depending on the chemical and physical conditions employed. In this process, further free acidity and water are recovered for recycle to the process. Sulphide is utilized in the process by means of the precipitation recovery of base metals from sulphate solution into a sulphur-based product by use of a sulphide salt or hydrogen sulphide with further purification by removal of sulphur and other elements and recovery of sulphur into a usable form. Sulphide may be regenerated from the sulphur, sulphide, polysulphide, polythionate, thiosulphate or similar intermediate products that may be produced from the dryer off-gases.

Additional amounts of soluble iron may be removed in the chloride circuit by conventional atmospheric or low-pressure atmospheric leach using hydrochloric acid, either during PGM dissolution or separately. After optional removal of some free acidity by split recycle, precipitation, reverse osmosis, nanofiltration or other conventional means, iron is recovered by use of established solvent extraction, sparging/rectification, pyrohydrolysis at ~700° C. in a fluid bed or spray roast reactor or pressure precipitation techniques at ~160-190° C. This yields a potentially saleable hematite, maghemite, magnetite or goethite product (42), depending on the chemical and physical conditions employed. In this process, further free acidity and water, as well as valuable base metals, such as residual nickel, copper and cobalt, are recovered for recycle to the process.

In some cases, differential flotation may be required to produce separate saleable concentrates, as well as to reduce the amount of barren sulphide minerals to the concentrate, thereby reducing the recovery of PGMs and base metals to the concentrates and reducing the value of the concentrates paid by smelters. The invention described herein is capable of tolerating higher sulphur and iron grades in flotation concentrates than conventional matte smelting. This allows for higher overall flotation mass pulls and lower PGM and base metals concentrate grades. This effectively increases the overall flotation recoveries of metals and may have a major impact on the overall economics of a metal recovery operation. This also enables the treatment of hitherto untreatable concentrates, such as final scavenger concentrates, secondary cleaner concentrates and products from low-grade ores and tailings.

There are several benefits that may arise from implementation of the process described:
Techno-Economic
  substantial decrease in energy consumption, water use and $SO_2+CO_2$ emissions compared with smelting;
  decrease in oxygen consumption for high-sulphur concentrates by use of partial oxidation;
  decrease in cooling requirements for high-sulphur concentrates by use of partial oxidation;
  processing of low-grade concentrates such as final scavenger concentrates, secondary cleaner concentrates and products from low-grade ores and tailings, without constraints on grade and gangue impurities imposed by smelter terms;
  increased flotation recoveries by increasing mass pull;

treatment of significantly higher Cr and MgO grades in concentrate than can be economically smelted;

recovery of reagents usable within the process, such as precipitants, coagulants and acids;

recovery of further free acidity and water, as well as valuable base metals, such as residual nickel, copper and cobalt, for recycle to the process thereby increasing overall metal recoveries and reducing water, energy and reagent consumptions.

Environmental capture of sulphur as a potentially saleable or storable by-product, substantially reducing gaseous, water-borne or land-based emissions;

capture of iron as a potentially saleable or storable by-product, substantially reducing gaseous, water-borne or land-based emissions;

recycle of water and other components, minimizing use of make-up water;

large reduction in energy consumption compared with conventional smelting, with associated substantial decrease in $CO_2$ emissions.

Safety and Operability avoidance of the high temperature rock melting conditions required in traditional smelting, minimisation of noxious fumes.

EXAMPLES

Typically, different combinations of techniques are required, depending on specific sample mineralogy, chemistry and metallurgical response. The following examples are provided to demonstrate the efficacy of individual techniques that have been brought to bear in various combinations on specific feed materials, resulting in iron and sulphur removal and reuse or regeneration of reagents.

Example 1

Sulphate Conditioning Removal of Iron, Sulphur and Other Elements from POX Residue In this example the residue from a POX treatment of a concentrate is subjected to an atmospheric hot sulphuric acid conditioning step to effect the removal of further iron and precipitated sulphate as well as other elements such as aluminium, magnesium, scandium, zinc, nickel, copper, cobalt, manganese, etc. This can be into a separate stream or into the same slurry stream as the POX residue. Table 1 shows the enhanced Fe recovery after atmospheric teach.

TABLE 1

Elemental Recoveries in POX and Atmospheric Leach Stages

| | Extraction (%) | | | | | | |
|---|---|---|---|---|---|---|---|
| Stage | Pd | Pt | Au | Ni | Cu | Co | Fe |
| Chlorination 1 residue (POX Test 1, 225° C.) | 0.0 | 0.0 | 0.0 | 98.3 | 98.9 | 97.7 | 19.8 |
| Chlorination 1 residue (POX Test 1, 200° C. + Atm Leach) | 0.0 | 0.0 | 0.0 | 98.1 | 85.9 | 76.4 | 68.0 |

Example 2

Figure 5:
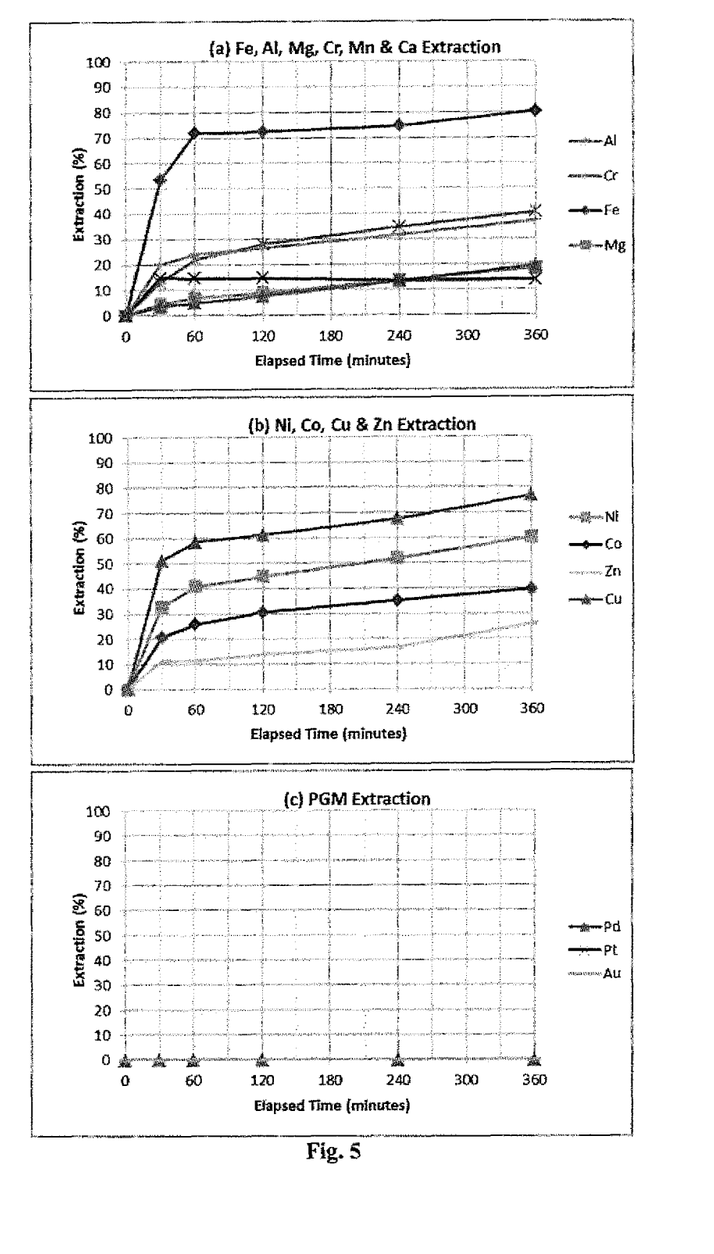
FIG. 5 is three graphs showing the conditioning of POX residue by atmospheric leach to remove iron and other metals in an example of sulphate conditioning removal of iron, sulphur and other elements from POX residue.

Sulphate Conditioning Removal of Iron, Sulphur and Other Elements from POX Residue In this second example the residue from a POX treatment of a low-grade concentrate is subjected to an atmospheric hot sulphuric acid conditioning step to effect the removal of further iron and precipitated sulphate as well as other elements such as aluminium, magnesium, scandium, zinc, nickel, copper, cobalt, manganese, etc. FIG. 5 shows the enhanced removal of iron as well as recovery of base metals, while leaving PGMs in the solids residue, for recovery in the downstream Kell unit processes.

Example 3

Thermal Removal of Sulphur from a POX Residue and Recovery of Sulphur into a Usable Form, Including as Sulphide Suitable for Use in the Process as a Precipitant of Base Metals and Precious Metals in the Sulphate and Chloride Streams In this example two POX residues containing sulphur were subjected a desulphurization step and the sulphur was shown to be removed from the solids, available for recovery from the gas phase. Thermal treatment was carried out on residue solids from POX Test 1 and POX Test 2 carried out under different conditions of pressure oxidation to achieve different sulphur speciation chemistries in the POX residue solids. The tests were conducted in a rotary kiln at 950° C. under controlled atmospheric conditions. Results are summarized in Tables 2, 3 and 4. A higher mass loss was observed for the residue from POX Test 1 and this relates to the extent of sulphur volatilization and the higher sulphate content in the POX residue.

TABLE 2

Summary of Elemental Recoveries for High Temperature POX Route

| | Extraction, % | | | | | | | |
|---|---|---|---|---|---|---|---|---|
| Stage | Pd[1] | Pt | Au | Ni | Cu | Co | Fe | S |
| POX Test 1 | 0.00 | 0.00 | 0.00 | 98.3 | 98.9 | 97.7 | 19.8 | 66.0 |
| Chlorination | 95.1 | 99.2 | 99.7 | 92.7 | 93.9 | 84.8 | 89.5 | 97.6 |
| Overall | 98.7 | 99.3 | 99.8 | 99.9 | 100 | 99.9 | 94.5 | 100 |

Temperature: 225° C.

TABLE 3

Summary of Elemental Recoveries for Mid Temperature POX Route

| | Extraction, % | | | | | | | |
|---|---|---|---|---|---|---|---|---|
| Stage | Pd | Pt | Au | Ni | Cu | Co | Fe | S |
| POX Test 2 | 0.00 | 0.00 | 0.00 | 82.4 | 65.0 | 63.4 | 72.8 | 83.1 |
| Chlorination | 99.1 | 92.0 | 93.5 | 96.2 | 99.6 | 94.6 | 66.8 | 99.4 |
| Overall | 99.0 | 90.8 | 94.1 | 99.7 | 99.9 | 99.2 | 94.1 | 100 |

Temperature: 150° C.

TABLE 4

Sulphur Removal from Two Different POX Residues

| Stage | Mass Loss, % | Sulphur volatilization, % | Sulphate content, % SO$_4$ |
|---|---|---|---|
| Thermal Treatment 1 (POX Test 1) | 43 | 97.3 | 32 |
| Thermal Treatment 2 (POX Test 2) | 5.5 | 64.8 | 3.7 |

Example 4

Solvent Extraction Removal of Iron from Chloride Leach Solution, Separation of Iron and Recovery of Chloride Lixiviant In this example iron is removed from the pregnant leach solution in the chlorination step by use of solvent extraction. In this specific case the organic phase comprised tri-n-butyl phosphate in kerosene with an isodecanol modifier. Results of preliminary extraction testing has shown TBP to be highly selective for Fe and Au, with >98% extraction observed in a single stage using 20% TBP in Shellsol 2325 at O:A of 1 (refer to Table 5). Conditions are typically selected to 'squeeze out' entrained and poorly-extracted metals including some PM and remaining BMs.

TABLE 5

Elemental extraction (%) from PM PLS using TBP

| Fe | Au | Pt | Pd | Rh | Ru | Ir | Os | Ni | Cu | Co |
|---|---|---|---|---|---|---|---|---|---|---|
| 99 | 98 | 14 | 5 | 6 | 4 | 1 | 63 | 4 | 2 | 0 |

REFERENCES

Incorporated Herein by Reference

1. Liddell, K. S. Hydrometallurgical treatment process for extraction of platinum group metals obviating the matte smelting process, R.S.A. Pat. 2000/6600: Appl. 19 May 1998: Acc. Jul. 25, 2001; U.S. Pat. No. 6,579,504: Appl. 19 May 1999: Acc. Jun. 17, 2003; Canada Pat. 2,332,520: Appl. 19 May 1999: Acc. Jan. 27, 2009.
2. Liddell, K. S. and Adams, M. D. Kell hydrometallurgical process for extraction of platinum group metals and base metals from flotation concentrates, J. S. Afr. Inst. Min. Metall. Trans., vol. 112, January 2012, pp. 31-36.
3. Liddell, K. S., Newton, T., Adams, M. D. and Muller, B. Energy consumptions in Kell hydrometallurgical refining versus conventional pyrometallurgical smelting of PGM concentrates, J. S. Afr. Inst, Min. Metall. Trans., vol. 111, February 2011, pp. 127-132.
4. Liu, W., Sarofim, A. F. and Flytzani-Stephanopoulos, M. Reduction of sulfur dioxide by carbon monoxide to elemental sulfur over composite oxide catalysts, *Applied Catalysis B: Environmental*, Vol. 4, No. 2-3, 1994, pp. 167-186.
5. Pack, D. J., Parks, D. W. and Chesnoy, A. B. Gas pipeline preferential site selection occurrence for elemental sulphur & other particle matter formation & deposition, *Journal of Petroleum Science and Engineering*, Vol. 94-95, 2012, pp. 12-18.
6. Chung, J. S., Paik, S. C., Kim, H. S., Lee, D. S. and Nam, I. S. Removal of H$_2$S and/or SO$_2$ by catalytic conversion technologies, *Catalysis Today*, Vol. 35, No. 1-2, 1997, pp. 37-43.

The invention claimed is:

1. A hydrometallurgical process for extracting platinum group metals (PGMs), gold, silver and base metals from a flotation concentrate, the process comprising the steps of:
    (a) subjecting the concentrate to modified pressure oxidation to selectively separate the base metals from the PGMs, gold and silver in a sulfate medium, wherein sulfide minerals are partially or completely oxidized, to produce a product slurry containing base metal sulfates in solution and a solid residue containing PGMs, gold and silver along with sulfate and elemental sulfur;
    (b) filtering the product slurry from step (a) to obtain the solid residue containing PGMs, gold and silver along with sulfate and elemental sulfur and the filtrate containing the base metal sulfates;
    (c) subjecting the solid residue from step (b) to thermal treatment comprising:
        (i) heating at 300-750° C. for up to 120 minutes under oxidizing, neutral or reducing conditions, to remove sulfate and elemental sulfur from the solid residue as disulfide, sulfur dioxide and/or hydrogen sulfide gases, and
        (ii) heating at 500-1000° C. for up to 120 minutes under oxidizing, neutral or reducing conditions, to condition the PGMs to be soluble in chloride medium; and
    (d) recovering PGMs, gold and silver from the treated solid residue of step (c) by leaching in a chloride leaching medium,
thereby extracting said PGMs, gold, silver and base metals.

2. The process according to claim 1, wherein, at step (c)(i), the heating is at 300-650° C. for 10-30 minutes.

3. The process according to claim 1, wherein, at step (c)(ii) the heating is at 500-1000° C. for 30-120 minutes.

4. The process according to claim 1, wherein the thermal treatment of step (c)(i) is a desulfurization process in which the solid residue is heated at 400-650° C., followed by heating at step (c)(ii) at 700-1000° C.

5. The process according to claim 1, wherein the product slurry produced in step (a) is further subjected to a hot acidic conditioning step or atmospheric leaching that comprises oxygen addition, to remove iron to the solution phase, after which the slurry is subjected to filtering step (b).

6. The process according to claim 5, wherein, at step (a) acid and oxygen addition rates, temperature, pressure, slurry density and residence times, are controlled to obtain oxidation of the sulfide minerals wherein more than 10% by mass of the sulfur is retained as elemental sulfur or sulfates, in the solid residue.

7. The process according to claim 6, wherein, at step (a), the acid and oxygen addition rates, temperature, pressure, slurry density and residence times, are controlled to obtain oxidation of the sulfide minerals wherein more than 20% by mass of the sulfur is retained as elemental sulfur or sulfates, in the solid residue.

8. The process according to claim 7, wherein, at step (a), the acid and oxygen addition rates, temperature, pressure, slurry density and residence times, are controlled to obtain oxidation of the sulfide minerals wherein more than 30% by mass of the sulfur is retained as elemental sulfur or sulfates in the solid residue.

9. The process according to claim 8, wherein, at step (a), the acid and oxygen addition rates, temperature, pressure, slurry density and residence times, are controlled to obtain oxidation of the sulfide minerals wherein more than 40% by mass of the sulfur is retained as elemental sulfur or sulfates, in the solid residue.

10. The process according to claim 9, wherein, at step (a), the acid and oxygen addition rates, temperature, pressure, slurry density and residence times, are controlled to obtain oxidation of the sulfide minerals wherein more than 50% and up to 80% by mass of the sulfur is retained as elemental sulfur or sulfates in the solid residue.

11. The process according to claim 1, wherein
(A) sulfide levels in the flotation concentrate are 5-50% by mass sulfur, and
(B) pressure oxidation conditions in the sulfide leaching are selected to control a partial oxidation of the sulfide minerals so that more than 10%, and up to approximately 80% by mass of the sulfur is retained as elemental sulfur in the solid residue.

12. The process according to claim 11, wherein the modified pressure oxidation in a sulfate medium is carried out at 100-230° C. and 500-3000 kPa.

13. The process according to claim 12, wherein the modified pressure oxidation in a sulfate medium is carried out at 100-160° C. and 500-2000 kPa.

14. The process according to claim 1, wherein, at step (c)(i), sulfur is recovered from the disulfide, sulfur dioxide and/or hydrogen sulfide gases of the thermal treatment steps by:
(A) condensation as an elemental sulfur intermediate product; or
(B) recovery into a sulfuric acid intermediate product; or
(C) recovery into a sulfide, polysulfide, polythionate, or thiosulfate intermediate product.

15. The process according to claim 1, wherein filtrate from step (b) is treated by atmospheric or low-pressure atmospheric leaching using sulfuric acid, resulting in recovery of sulfuric acid and precipitation of an iron product.

16. The process according to claim 1, wherein at step (d) the treated solid residue from step c (ii) comprises soluble iron and the soluble iron is removed by:
(A) conventional atmospheric or low-pressure atmospheric leaching using hydrochloric acid without addition of chlorine, allowing recovery of the acid and precipitation of a marketable or storable iron product; or
(B) solvent extraction, after conventional atmospheric or low-pressure leaching of the PGM using non-chlorinated hydrochloric acid preleach liquor or chlorinated hydrochloric acid, allowing recovery of the acid and precipitation of a marketable or storable iron product from chloride leaching filtrate; or
(C) direct treatment of chloride leaching filtrate after conventional atmospheric or low-pressure leaching of the PGM, gold and silver using chlorinated hydrochloric acid; or
(D) a combination of (A), (B) and/or (C).

17. The process according to claim 1, wherein, at step (d), the chloride leaching medium comprises iron chloride and the iron chloride is:
(A) treated by pressure autoclave, precipitation or crystallization, to produce a marketable or storable iron-bearing product and recovering hydrochloric acid into a stream suitable for recycling;
(B) concentrated by evaporation, reverse osmosis, or nanofiltration to produce a marketable ferric chloride product; or
(C) treated by sparging/rectification, pyrohydrolysis or sulfuric acid distillation, to produce an iron-bearing product.

18. A hydrometallurgical process for extracting PGMs, gold, silver and base metals from a flotation concentrate, the process comprising the steps of:
(a) subjecting the concentrate to a two-stage leaching process comprising:
(i) a pressure oxidation step to selectively separate the base metals from the PGMs, gold and silver in a sulfate medium to produce a product slurry containing base metal sulfates in a solution phase and a solid residue containing PGMs, gold and silver; and
(ii) a hot acidic conditioning step or atmospheric leaching of the slurry, to remove iron to the solution phase;
(b) filtering the product slurry from step (a)(i) and/or the conditioned or leached slurry from step (a)(ii) to obtain the solid residue containing PGMs, gold and silver and a filtrate containing the base metal sulfates;
(c) first subjecting the solid residue from step (b) to thermal treatment at 300-750° C. for up to 120 minutes under oxidizing, neutral or reducing conditions to remove sulfate and elemental sulfur from the solid residue as disulfide, sulfur dioxide and/or hydrogen sulfide gases; and
(d) subjecting the solid residue from step (b) or (c) to thermal treatment at 500-1000° C. for up to 120 minutes under oxidizing, neutral or reducing conditions to condition the PGMs to be soluble in chloride medium; and
(e) subjecting the treated solid residue from step (d) to leaching in chloride leaching medium to recover the PGMs, gold and silver,
thereby extracting said PGMs, gold, silver and base metals.

19. The process according to claim 18, wherein the pressure oxidation leaching of step (a)(i) is carried out at 150-200° C.

20. The process according to claim 18, wherein the thermal treatment of step (d) is at 500-1000° C. for 30 to 120 minutes.

21. The process according to claim 20, wherein the thermal treatment is at 700-1000° C.

22. The process according to claim 18, wherein, at step (e) the treated solid residue from step (d) comprises soluble iron and the soluble iron is removed by:
(A) conventional atmospheric or low-pressure atmospheric leaching using hydrochloric acid, allowing recovery of the acid and precipitation of a marketable or storable iron product; or
(B) solvent extraction, after conventional atmospheric or low-pressure leaching of the PGM using chlorinated hydrochloric acid, allowing recovery of the acid and precipitation of a marketable or storable iron product from chloride leaching filtrate; or
(C) direct treatment of chloride leaching filtrate after conventional atmospheric or low-pressure leaching of the PGM, gold and silver using chlorinated hydrochloric acid; or
(D) a combination of (A), (B) and/or (C).

23. The process according to claim 18, wherein, at step (e), the chloride leaching medium comprises iron chloride and the iron chloride is:
(A) treated by pressure autoclave, precipitation or crystallization, to produce a marketable or storable iron-bearing product and recovering hydrochloric acid into a stream suitable for recycling;
(B) concentrated by evaporation, reverse osmosis, or nanofiltration to produce a marketable ferric chloride product; or (C) treated by sparging/rectification, pyrohydrolysis or sulfuric acid distillation, to produce an iron-bearing product.

24. The process according to claim 18, wherein slurry from step (b) is treated by atmospheric or low-pressure atmospheric leaching using sulfuric acid, followed by liquid-solid separation, resulting in removal of iron from the solid residue, recovery of sulfuric acid and precipitation of an iron product.

* * * * *